US012238553B2

(12) United States Patent
Otaka

(10) Patent No.: US 12,238,553 B2
(45) Date of Patent: Feb. 25, 2025

(54) COMMUNICATION CONTROL APPARATUS, MOVABLE OBJECT, COMMUNICATION CONTROL METHOD, AND COMPUTER READABLE STORAGE MEDIUM

(71) Applicant: HONDA MOTOR CO., LTD., Tokyo (JP)

(72) Inventor: Masaru Otaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 387 days.

(21) Appl. No.: 17/676,857

(22) Filed: Feb. 22, 2022

(65) Prior Publication Data

US 2022/0303802 A1    Sep. 22, 2022

(30) Foreign Application Priority Data

Mar. 19, 2021   (JP) .................. 2021-045909

(51) Int. Cl.
*H04W 24/08* (2009.01)
*H04W 4/40* (2018.01)
(Continued)

(52) U.S. Cl.
CPC ............ *H04W 24/08* (2013.01); *H04W 4/40* (2018.02); *H04W 12/06* (2013.01); *H04W 48/16* (2013.01); *H04W 84/12* (2013.01)

(58) Field of Classification Search
CPC ....... H04W 24/08; H04W 4/40; H04W 4/027; H04W 12/06; H04W 48/16; H04W 84/12; H04W 36/08; H04W 36/165
(Continued)

(56) References Cited

U.S. PATENT DOCUMENTS

2013/0272269 A1   10/2013 Srivastava
2016/0119816 A1   4/2016 Yasukawa
(Continued)

FOREIGN PATENT DOCUMENTS

CN   107979841 A   5/2018
CN   110267230 A   9/2019
(Continued)

OTHER PUBLICATIONS

Office Action issued for counterpart Japanese Application No. 2021-045909, issued by the Japanese Patent Office on Nov. 22, 2022 (drafted on Nov. 15, 2022).
(Continued)

*Primary Examiner* — Candal Elpenord

(57) ABSTRACT

A communication control apparatus provided in a movable object acquires, while a communication unit communicates with a first access point, information indicating a communication quality with a second access point for which an authentication different from that for the first access point is required, acquires authentication information by maintaining the communication between the communication unit and the first access point and also executing authentication processing for the second access point when the communication quality with the second access point exceeds a first threshold while the communication unit communicates with the first access point, and holds the authentication information. The communication control apparatus starts wireless communication with the second access point by using the held authentication information when the communication quality with the second access point is higher than a communication quality with the first access point.

20 Claims, 4 Drawing Sheets

(51) Int. Cl.
*H04W 12/06* (2021.01)
*H04W 48/16* (2009.01)
*H04W 84/12* (2009.01)

(58) Field of Classification Search
USPC .......................................................... 370/252
See application file for complete search history.

(56) References Cited

U.S. PATENT DOCUMENTS

| | | | |
|---|---|---|---|
| 2016/0373984 | A1 | 12/2016 | Hara |
| 2017/0265112 | A1* | 9/2017 | Morita .............. H04W 36/0077 |
| 2019/0124578 | A1* | 4/2019 | Nieh ..................... H04W 36/30 |
| 2019/0281429 | A1* | 9/2019 | Nishizaki .............. H04W 4/027 |
| 2020/0169884 | A1 | 5/2020 | Wu |
| 2020/0361477 | A1* | 11/2020 | Ha ........................ B60W 50/00 |
| 2022/0159535 | A1* | 5/2022 | Rahman .............. H04W 12/062 |
| 2022/0279393 | A1* | 9/2022 | Di Girolamo ........ H04W 72/02 |

FOREIGN PATENT DOCUMENTS

| | | | |
|---|---|---|---|
| JP | 2007282129 A | * | 10/2007 |
| JP | 2014030123 A | | 2/2014 |
| JP | 2014220719 A | | 11/2014 |
| JP | 2015525010 A | | 8/2015 |
| JP | 2017011416 A | | 1/2017 |
| JP | 2019204298 A | | 11/2019 |

OTHER PUBLICATIONS

Office Action issued for counterpart Chinese Application 202210121837. 6, issued by The State Intellectual Property Office of People's Republic of China on Oct. 31, 2023.

* cited by examiner

COMMUNICATION CONTROL APPARATUS, MOVABLE OBJECT, COMMUNICATION CONTROL METHOD, AND COMPUTER READABLE STORAGE MEDIUM

The contents of the following Japanese patent application (s) are incorporated herein by reference:
NO. 2021-045909 filed on Mar. 19, 2021.

BACKGROUND

1. Technical Field

The present invention relates to a communication control apparatus, a movable object, a communication control method, and a computer readable storage medium.

2. Related Art

Patent document 1 describes disconnection from one access point and connection to another access point in wireless LAN communication.
Patent document 1: Japanese translation publication of a PCT route patent application 2015-525010

DESCRIPTION OF EXEMPLARY EMBODIMENTS

Hereinafter, the present invention will be described by way of embodiments of the invention, but the following embodiments are not intended to restrict the invention according to the claims. In addition, not all combinations of features described in the embodiments necessarily have to be essential to solving means of the invention.

Figure 1:
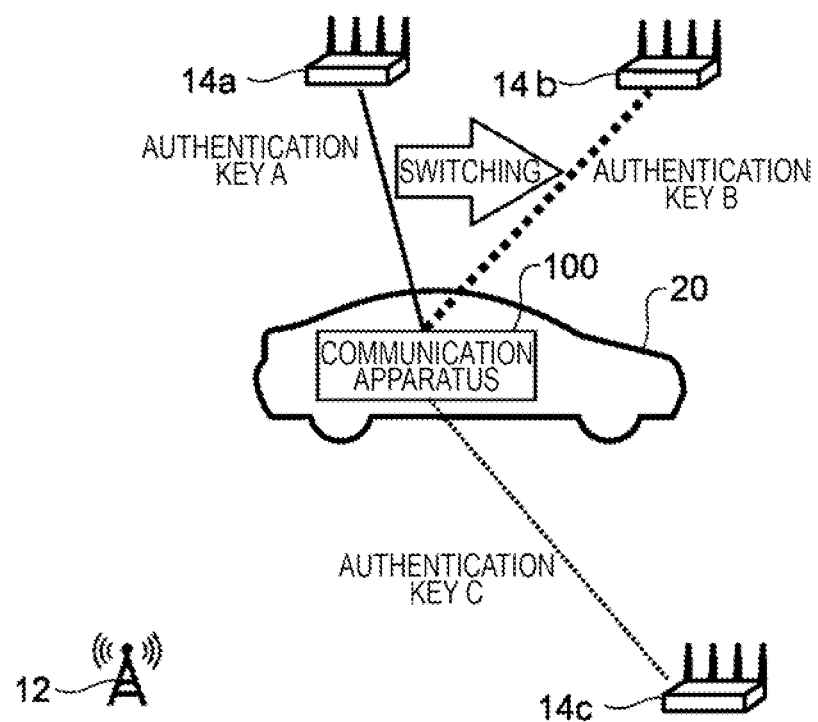
FIG. 1 schematically illustrates a vehicle 20 according to one embodiment together with a wireless access point 14 and a base station 12.

FIG. 1 schematically illustrates a vehicle 20 according to one embodiment together with a wireless access point 14a, a wireless access point 14b, and a wireless access point 14c as well as a base station 12. According to the present embodiment, the wireless access point 14a, the wireless access point 14b, and the wireless access point 14c may be collectively referred to as a "wireless access point 14".

The base station 12 is a base station belonging to a mobile communication network. The wireless access point 14 functions as a wireless base station or a relay station. The wireless access point is, for example, a wireless LAN access point. The wireless access point 14 may be, for example, a public wireless LAN access point. The wireless access point 14 may be a wireless access point installed in a transportation infrastructure. The wireless access point 14 may be a wireless access point installed in a facility provided in proximity to the transportation infrastructure.

The vehicle 20 includes a communication apparatus 100. The communication apparatus 100 includes a function for performing wireless local area network communication (wireless LAN communication) and a function for performing mobile communication through the base station 12. The communication apparatus 100 includes a function for switching the wireless access point 14 to be set as a connection destination. The communication apparatus 100 is configured to connect to the wireless access point 14a and perform wireless LAN communication through the wireless access point 14a. Herein, the communication apparatus 100 is configured to communicate with the wireless access point 14a by using an authentication key A. During communication with the wireless access point 14a, the communication apparatus 100 performs a search for the neighboring wireless access point 14b and the neighboring wireless access point 14c, and also acquires an RSSI of communication with the wireless access point 14b and an RSSI of communication with the wireless access point 14c.

During wireless LAN communication with the wireless access point 14a, when the RSSI of the communication with the wireless access point 14b is higher than a predetermined threshold, the communication apparatus 100 performs an authentication with the wireless access point 14b to acquire an authentication key B and holds the authentication key B. In addition, during wireless LAN communication with the wireless access point 14a, when the RSSI of the communication with the wireless access point 14c is higher than a predetermined threshold, the communication apparatus 100 performs an authentication with the wireless access point 14c to acquire an authentication key C and holds the authentication key C.

Then, when the RSSI of the communication with the wireless access point 14b is higher than the RSSI of the communication with the wireless access point 14a, the communication apparatus 100 starts wireless LAN communication with the wireless access point 14b by using the held authentication key B. According to control of the communication apparatus 100, since authentication information of the wireless access point 14b is acquired in advance and held during the communication with the wireless access point 14a, reduction in communication throughput can be suppressed as compared with a case where authentication of the wireless access point 14b is executed following disconnection of the connection with the wireless access point 14a after the wireless access point 14b at a transfer destination is determined.

Figure 2:
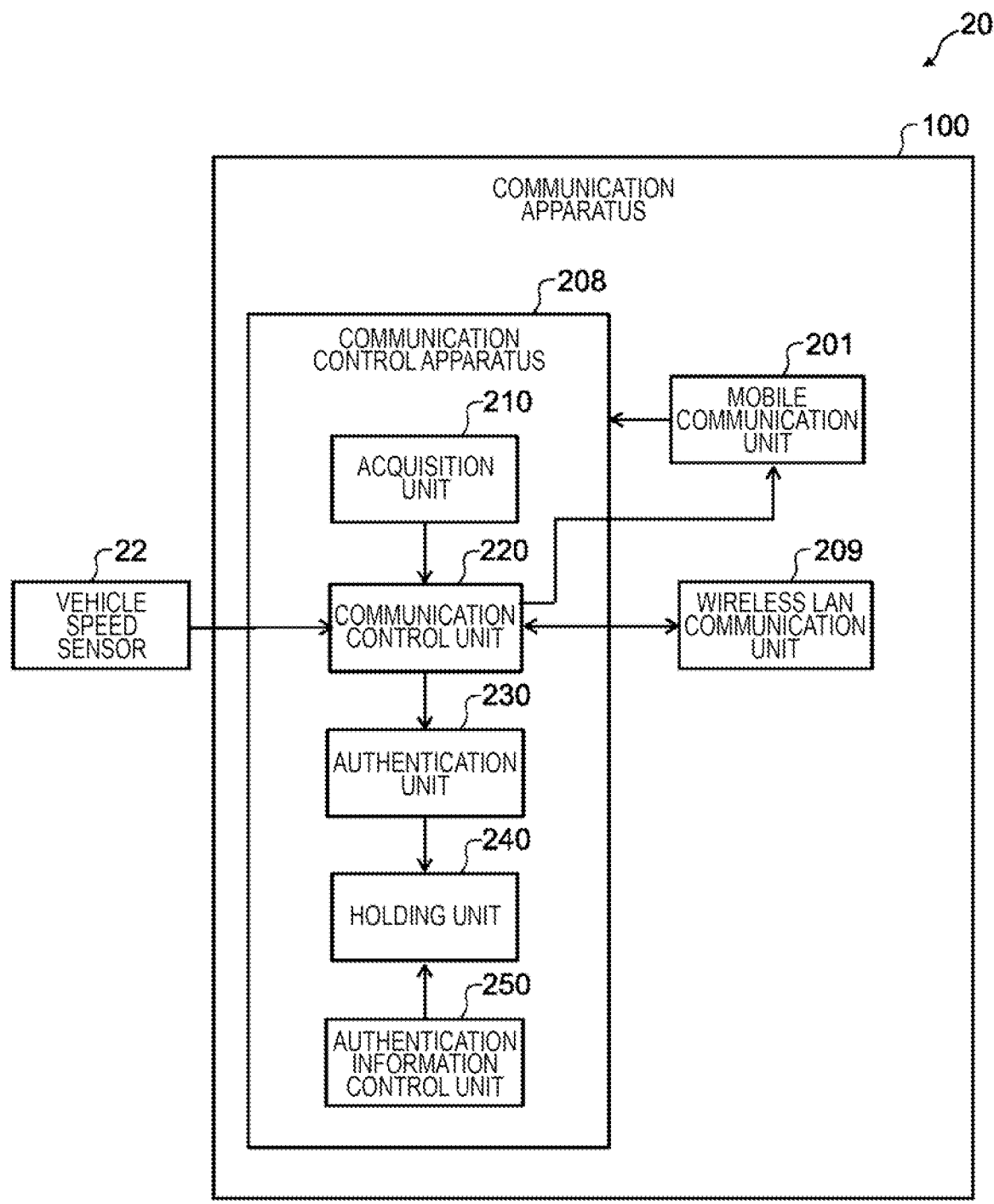
FIG. 2 schematically illustrates a system configuration of the vehicle 20.

FIG. 2 schematically illustrates a system configuration of the vehicle 20. The vehicle 20 includes the communication apparatus 100 and a vehicle speed sensor 22. The vehicle speed sensor 22 detects a vehicle speed of the vehicle 20. The communication apparatus 100 includes a mobile communication unit 201, a communication control apparatus 208, and a wireless LAN communication unit 209.

According to the present embodiment, a configuration is exemplified in which the vehicle 20 includes the communication apparatus 100 and the vehicle speed sensor 22, but the system configuration of the vehicle 20 is not limited to the example of the present embodiment.

The mobile communication unit 201 is mainly responsible for mobile communication. The wireless LAN communication unit 209 is responsible for wireless LAN communication. The wireless LAN communication unit 209 has two or more wireless LAN communication units. For example, in a case where communication with the wireless access point 14a is performed by one wireless LAN communication unit, the wireless LAN communication unit 209 acquires an authentication key when an authentication with the wireless access point 14b is executed by another wireless LAN communication unit. The communication control apparatus 208 includes an acquisition unit 210, a communication control unit 220, an authentication unit 230, a holding unit 240, and an authentication information control unit 250. The mobile communication unit 201 and the wireless LAN communication unit 209 may be realized as a single telematics control unit.

The communication control unit 220 is configured to control the wireless LAN communication unit 209. While the wireless LAN communication unit 209 communicates with a first access point, the acquisition unit 210 acquires information indicating a communication quality with a second access point for which an authentication different from that for the first access point is required. For example, an RSSI or the like can be applied as the communication quality. While the wireless LAN communication unit 209 communicates with the first access point, when the communication quality with the second access point exceeds a first threshold, the authentication unit 230 maintains the communication between the wireless LAN communication unit 209 and the first access point and also executes authentication processing for the second access point to acquire authentication information. The authentication information may be, for example, an authentication key such as a private key. The authentication information may be an authentication procedure to be executed following an Association procedure. The holding unit 240 holds the authentication information. When the communication quality with the second access point is higher than the communication quality with the first access point, the communication control unit 220 starts wireless communication with the second access point by using the authentication information held by the holding unit 240.

While the wireless LAN communication unit 209 communicates with the first access point, in a case where the communication quality with the second access point exceeds the first threshold even when the communication quality with the second access point is lower than the communication quality between the wireless LAN communication unit 209 and the first access point, the authentication unit 230 may maintain the communication between the wireless LAN communication unit 209 and the first access point and also execute the authentication processing for the second access point to acquire the authentication information.

While the wireless LAN communication unit 209 communicates with the first access point, the communication control unit 220 may execute a search for an access point multiple times. When the communication quality with the second access point exceeds the first threshold in the search consecutively executed, the authentication unit 230 may maintain the communication between the wireless LAN communication unit 209 and the first access point and also execute the authentication processing for the second access point to acquire the authentication information.

When the communication quality with the second access point is lower than or equal to a second threshold that is lower than the first threshold, the authentication information control unit 250 may delete the authentication information held by the holding unit 240. It should be noted that until the authentication information is deleted from the holding unit 240, the authentication unit 230 may perform update processing of the authentication information each time an update notification of the authentication information is received from the wireless access point 14, and hold the updated authentication information in the holding unit 240.

When the communication quality with the second access point is higher than the communication quality with the first access point, under a condition that a movement speed of the vehicle 20 is lower than a predetermined value, the communication control unit 220 may start wireless communication with the second access point by using the authentication information held by the holding unit 240.

In a case where the mobile communication unit 201 performs mobile communication, even when the communication quality with the second access point is lower than the first threshold, the communication control unit 220 may start the wireless communication with the second access point.

Figure 3:
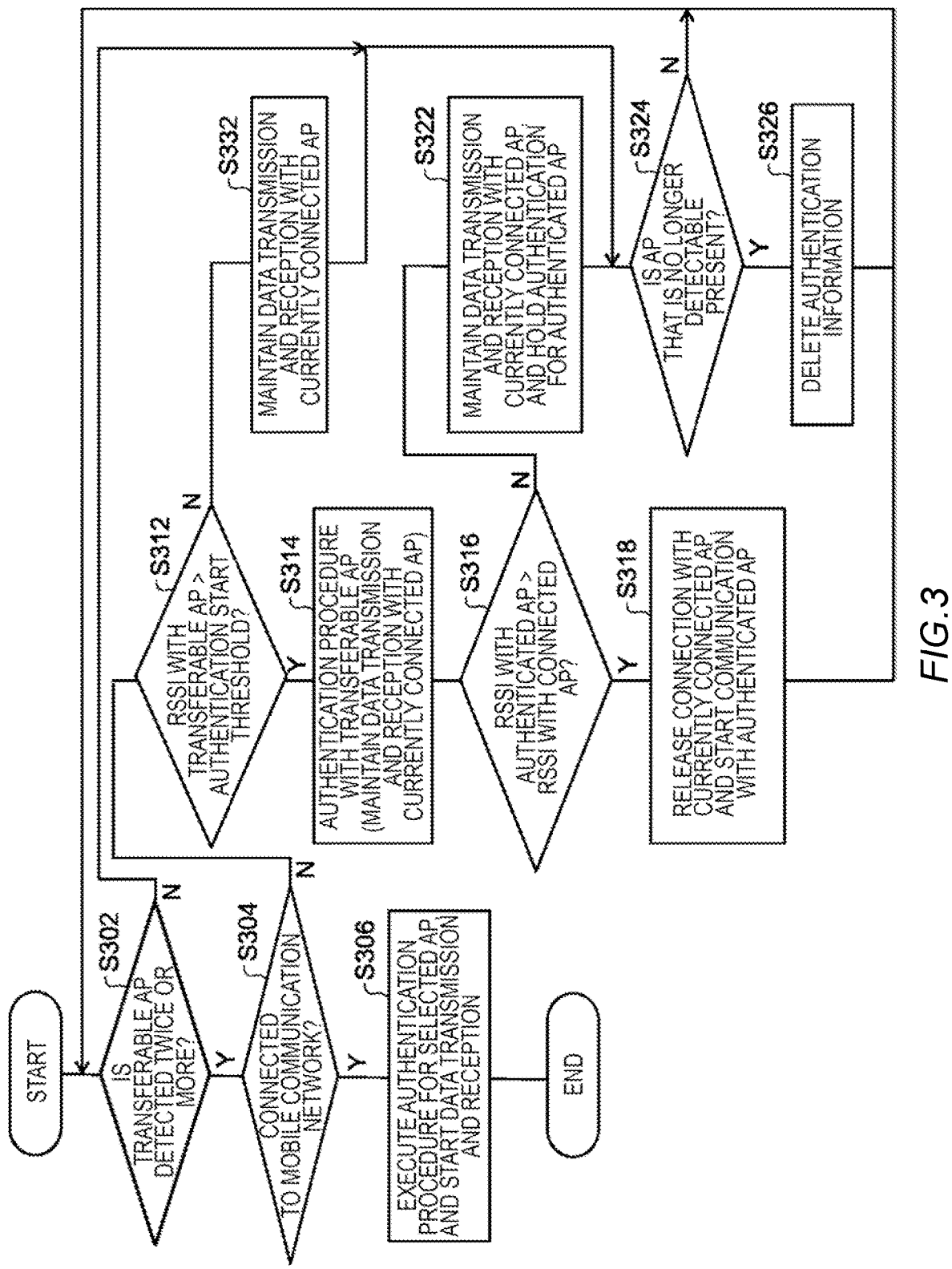
FIG. 3 is a flow chart illustrating a processing procedure related to a communication control method executed in a communication apparatus 100.

FIG. 3 is a flow chart illustrating a processing procedure related to a communication control method executed in the communication apparatus 100. Processing of this flow chart is started when the transferable wireless access point 14 is detected by scanning of the wireless access point 14. For example, the acquisition unit 210 periodically performs scanning for a search for the neighboring wireless access point 14. The acquisition unit 210 acquires an RSSI based on beacon transmitted from the wireless access point 14, and detects the wireless access point 14 having the RSSI higher than a predetermined detection threshold as the transferable wireless access point.

In S302, it is determined whether the wireless access point 14 consecutively detected twice or more as the transferable wireless access point is present in the scanning consecutively performed multiple times. When the wireless access point 14 consecutively detected twice or more as the transferable wireless access point is present, the processing proceeds to S304. When the wireless access point 14 consecutively detected twice or more as the transferable wireless access point is not present, the processing proceeds to S324.

In S304, the communication control unit 220 determines a current communication environment of the mobile communication unit 201. For example, it is determined whether the mobile communication unit 201 is connected to a mobile communication network. When the mobile communication unit 201 is not connected to the mobile communication network, the processing proceeds to S312. When the mobile communication unit 201 is connected to the mobile communication network, in S306, the communication control unit 220 selects the single wireless access point 14 among the one or more wireless access points 14 consecutively detected twice or more as the transferable wireless access point, executes the authentication procedure for the selected wireless access point 14, starts data transmission and reception based on wireless LAN communication, and ends the processing of this flow chart. It should be noted that after data communication based on the wireless LAN communication is started by the processing in 306, the data communication of the mobile communication by the mobile communication unit 201 may be stopped or ended.

In S312, it is determined whether an RSSI in communication with the transferable wireless access point 14 exceeds an authentication start threshold. The authentication start threshold may be a value higher than the detection threshold. When the RSSI in the communication with the transferable wireless access point 14 exceeds the authentication start threshold, the processing proceeds to S314. When the RSSI in the communication with the transferable wireless access point 14 does not exceed the authentication start threshold, the processing proceeds to S332. It should be noted that in S312, when the number of the wireless access points 14 for which the authentication information has been already acquired is higher than or equal to a predetermined number (for example, 2), the processing may proceed to S332.

In S314, the authentication unit 230 executes the authentication procedure for the transferable wireless access point 14, and the holding unit 240 holds the authentication key acquired by the authentication unit 230 through the authentication procedure. At this time, when the wireless access point 14 currently connected to the wireless LAN is present, the communication control unit 220 maintains the wireless LAN connection with the wireless access point 14 and continues the data communication.

Subsequently, in S316, the communication control unit 220 determines whether the RSSI in the communication with the authenticated wireless access point 14 exceeds the RSSI in the communication with the wireless access point 14 currently executing the wireless LAN communication (referred to as the wireless access point 14 currently connected to the wireless LAN). It should be noted that a determination as to whether the RSSI in the communication with the authenticated wireless access point 14 is higher than a sum of the RSSI in the communication with the wireless access point 14 currently connected to the wireless LAN and a predetermined value may be applied as the determination in S316. In addition, a determination as to whether the RSSI in the communication with the authenticated wireless access point 14 is higher than a predetermined connection start threshold and also the RSSI in the communication with the authenticated wireless access point 14 exceeds the RSSI in the communication with the wireless access point 14 currently connected to the wireless LAN may be applied as the determination in S316. It should be noted that the "authenticated wireless access point 14" refers to the wireless access point 14 for which the authentication procedure in S314 has been completed and the authentication key has been acquired.

In the determination in S316, when it is determined that the RSSI in the communication with the authenticated wireless access point 14 does not exceed the RSSI in the communication with the wireless access point 14 currently connected to the wireless LAN, the processing proceeds to S322. On the other hand, when it is determined that the RSSI in the communication with the authenticated wireless access point 14 exceeds the RSSI in the communication with the wireless access point 14 currently connected to the wireless LAN, the processing proceeds to S318. In S318, the wireless LAN connection with the wireless access point 14 currently connected to the wireless LAN is released, data communication with the authenticated wireless access point 14 is started, and the processing proceeds to S302.

In S322, data transmission and reception with the wireless access point 14 currently connected to the wireless LAN are maintained, and also the authentication key acquired by the authentication with the authenticated wireless access point 14 is held in the holding unit 240. Subsequently, in S324, it is determined whether the wireless access point 14 that is no longer detected as the wireless access point 14 having the RSSI higher than the detection threshold is present among the wireless access points 14 for which the authentication key has been acquired. When the wireless access point 14 that is no longer detected as the wireless access point 14 having the RSSI higher than the detection threshold is present, the authentication information of the wireless access point 14 is deleted (S326), and the processing proceeds to S302. When the wireless access point 14 that is no longer detected as the wireless access point 14 having the RSSI higher than the detection threshold is not present, the processing proceeds to S302.

It should be noted that in S332, when the wireless access point 14 currently connected to the wireless LAN is present, the wireless LAN connection with the wireless access point 14 is maintained to maintain the data transmission and reception, and the processing proceeds to S324.

As described in association with S316 or the like in this flow chart, the control is performed to switch the wireless access point 14 when the RSSI in the communication with the authenticated wireless access point 14 is higher than the connection start threshold that is higher than the authentication start threshold and also the RSSI in the communication with the authenticated wireless access point 14 exceeds the RSSI in the communication with the wireless access point 14 currently connected to the wireless LAN, so that it is possible to avoid the frequent switching of the wireless access point 14. With this configuration, reduction in throughput which is adversely caused by the frequent switching of the wireless access point 14 can be suppressed. The above described control is advantageous in a case where a large number of the wireless access points 14 are present in a metropolitan area.

It should be noted that with regard to the processing in S318 in the flow chart of FIG. 3, the communication control unit 220 may execute the processing in S318 under a condition that the speed detect by the vehicle speed sensor 22 is lower than a predetermined value. In addition, the processing in the flow chart of FIG. 3 may be executed under a condition that the speed of the vehicle 20 which is detected by the vehicle speed sensor 22 is lower than a predetermined value. In general, when the vehicle speed of the vehicle 20 is high, a probability that the switching of the wireless access point 14 frequently occurs is increased. For this reason, it is possible to avoid the frequent switching of the wireless access point 14 while the processing in S318 or the processing in the flow chart of FIG. 3 is not to be executed depending on the vehicle speed of the vehicle 20. With this configuration, the reduction in the throughput which is adversely caused by the frequent switching of the wireless access point 14 can be suppressed.

It should be noted that according to the present embodiment, the switching of the wireless access point 14 of the wireless LAN communication has been described, but the present embodiment may be applied to switching of an access point in a communication method other than the wireless LAN communication.

As described above, in accordance with the communication apparatus 100, while the communication is performed with one wireless access point 14, the authentication information of another wireless access point 14 is acquired in advance and held, so that the reduction in the communication throughput can be suppressed as compared with a case where, after the connection with the wireless access point 14 is disconnected, the authentication of the other wireless access point 14 is started.

Figure 4:
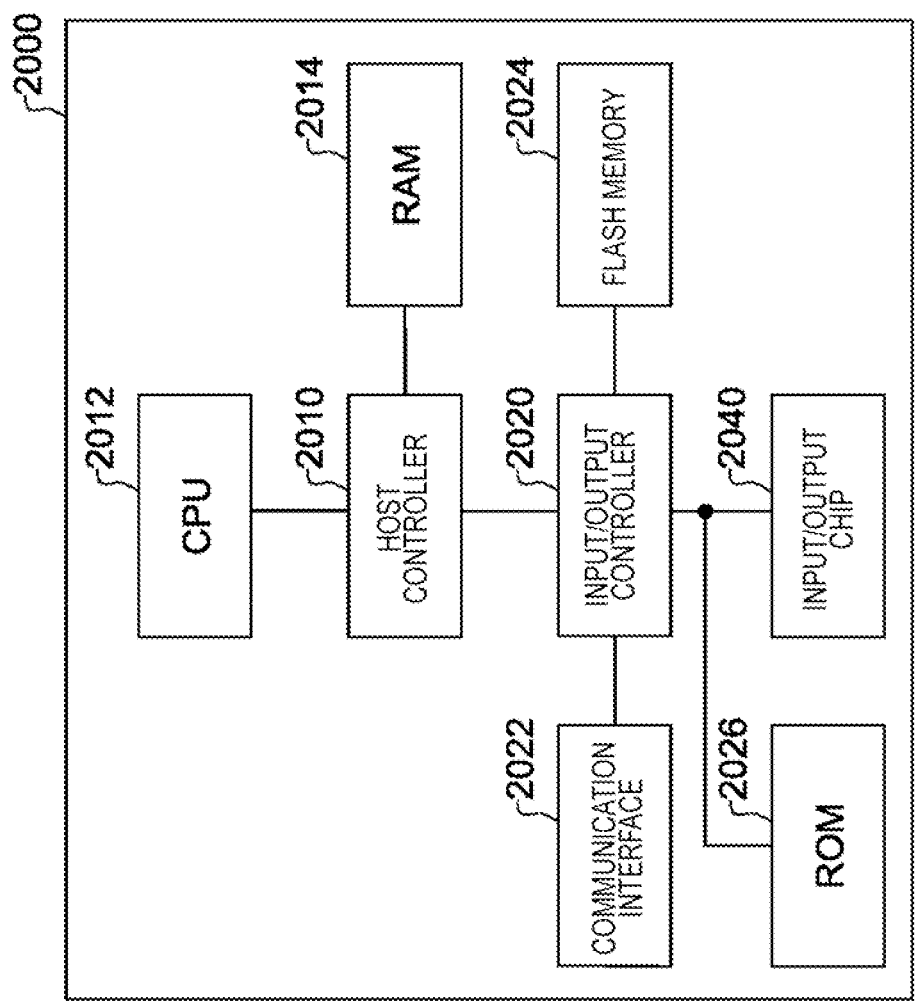
FIG. 4 illustrates an example of a computer 2000.

FIG. 4 illustrates an example of a computer 2000 where a plurality of embodiments of the present invention may be entirely or partially embodied. A program installed on the computer 2000 can cause the computer 2000 to function as a system such as the communication control apparatus according to the embodiments or each unit thereof, to perform operations associated with the system or each unit thereof, and/or to perform the process according to the embodiments or steps thereof. Such a program may be executed by a CPU 2012 in order to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040.

The ROM 2026, the flash memory 2024, the communication interface 2022, and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores programs and data used by the CPU 2012 in the computer 2000. The ROM 2026 stores a boot program or the like that is executed by the computer 2000 during activation, and/or a program that depends on hardware of the computer 2000. In addition, the input/output chip 2040 may connect various input/output units such as a keyboard, a mouse, and a monitor to the input/output controller 2020 via an input/output port such as a serial port, a parallel port, a keyboard port, a mouse port, a monitor port, a USB port, an HDMI (registered trademark) port.

A program is provided via a computer readable storage medium such as a CD-ROM, a DVD-ROM, or a memory card, or a network. The RAM 2014, the ROM 2026, or the flash memory 2024 is an example of the computer readable storage medium. The program is installed in the flash memory 2024, the RAM 2014, or the ROM 2026, and is executed by the CPU 2012. Information processing written in these programs is read by the computer 2000, resulting in cooperation between a program and the above-mentioned various types of hardware resources. An apparatus or a method may be configured by implementing operations or processing of information according to a use of the computer 2000.

For example, when communication is performed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads transmission data stored in a transmission buffer processing region provided in a recording medium such as the RAM 2014 or the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 to be read into the RAM 2014, and perform various types of processing on the data on the RAM 2014. The CPU 2012 then writes back the processed data into the recording medium.

Various types of information such as various types of programs, data, a table, and a database may be stored in the recording medium and may be subjected to information processing. The CPU 2012 may execute, on the data read from the RAM 2014, various types of processing including various types of operations, information processing, conditional judgement, conditional branching, unconditional branching, information retrieval and replacement, or the like described herein and specified by instruction sequences of the programs, and write back a result into the RAM 2014. In addition, the CPU 2012 may search for information in a file, a database, or the like in the recording medium. For example, when a plurality of entries, each having an attribute value of a first attribute associated with an attribute value of a second attribute, is stored in the recording medium, the CPU 2012 may search for an entry having a designated attribute value of the first attribute that matches a condition from the plurality of entries, and read the attribute value of the second attribute stored in the entry, thereby obtaining the attribute value of the second attribute associated with the first attribute that satisfies a predetermined condition.

A program or a software module described above may be stored in a computer readable storage medium on the computer 2000 or in proximity to the computer 2000. A recording medium such as a hard disk or a RAM provided in a server system connected to a dedicated communication network or the Internet can be used as a computer readable storage medium. The program stored in the computer readable storage medium may be provided to the computer 2000 via the network.

The program installed on the computer 2000 and causes the computer 2000 to function as the control system 200 may work on the CPU 2012 or the like to cause the computer 2000 to function as each unit of the communication control apparatus 208, respectively. Information processing written in these programs is read by the computer 2000, thereby functioning as each unit of the communication control apparatus 208 which is specific means in which a software and various hardware resources described above cooperate with each other. By implementing operations or processing of information according to the intended use of the computer 2000 in the present embodiment using these specific means, the communication control apparatus 208 specific to the intended use is constructed.

Various embodiments have been described with reference to the block diagrams and the like. In the block diagrams, each block may represent (1) a step of a process in which an operation is executed, or (2) each unit of the apparatus having a role in executing the operation. Specific steps and each unit may be implemented by a dedicated circuit, a programmable circuit supplied along with a computer readable instruction stored on a computer readable storage medium, and/or a processor supplied along with the computer readable instruction stored on the computer readable storage medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and other logical operations, and a memory element such as a flip-flop, a register, a field programmable gate array (FPGA), a programmable logic array (PLA), or the like.

The computer readable storage medium may include any tangible device capable of storing an instruction executed by an appropriate device. As a result, the computer readable storage medium having the instruction stored thereon constitutes at least a part of a product including an instruction that may be executed in order to provide a means to execute an operation specified by a processing procedure or a block diagram. Examples of computer readable storage media may include an electronic storage medium, a magnetic storage medium, an optical storage medium, an electromagnetic storage medium, a semiconductor storage medium, etc. More specific examples of the computer readable storage medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk (BD), a memory stick, an integrated circuit card, and the like.

The computer readable instruction may include: an assembler instruction, an instruction-set-architecture (ISA) instruction; a machine instruction; a machine dependent instruction; a microcode; a firmware instruction; state-setting data; or either a source code or an object code described in any combination of one or more programming languages, including an object oriented programming language such as Smalltalk (registered trademark), JAVA (registered trademark), C++, or the like; and a conventional procedural programming language such as a "C" programming language or a similar programming language.

Computer readable instructions may be provided to a processor of a general purpose computer, a special purpose computer, or other programmable data processing apparatus, or to programmable circuit, locally or via a local area network (LAN), wide area network (WAN) such as the Internet, and a computer readable instruction may be executed to provide means for performing operations specified in the described processing procedures or block diagrams. Examples of the processor include a computer processor, a processing unit, a microprocessor, a digital signal processor, a controller, a microcontroller, and the like.

While the embodiments of the present invention have been described, the technical scope of the present invention is not limited to the above described embodiments. It is apparent to persons skilled in the art that various alterations and improvements can be added to the above-described embodiments. It is also apparent from the scope of the claims that modes added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described by using phrases such as "first" or "next" in the claims, embodiments, or diagrams, it does not necessarily mean that the process must be performed in this order.

EXPLANATION OF REFERENCES 12 base station; 14 wireless access point; 20 vehicle; 201 mobile communication unit; 210 acquisition unit; 220 communication control unit; 230 authentication unit; 240 holding unit; 250 authentication information control unit; 2000 computer; 2010 host controller; 2012 CPU; 2014 RAM; 2020 input/output controller; 2022 communication interface; 2024 flash memory; 2026 ROM; 2040 input/output chip

What is claimed is:

1. A communication control apparatus provided in a movable object, the communication control apparatus comprising:
    at least one processor and at least one memory;
    a communication control unit configured to control, using the at least one processor, a communication unit configured to perform wireless communication with a first access point;
    an acquisition unit configured to acquire, using the at least one processor, while the communication unit communicates with the first access point, information indicating a communication quality with a second access point for which an authentication different from that for the first access point is required;
    an authentication unit configured to acquire, using the at least one processor, authentication information by maintaining the communication between the communication unit and the first access point and also executing authentication processing for the second access point responsive to the communication quality with the second access point exceeding a first threshold while the communication unit communicates with the first access point; and
    a holding unit configured to hold the authentication information in the at least one memory, wherein
    the communication control unit is configured to start, using the at least one processor, wireless communication with the second access point by using the authentication information held by the holding unit when the communication quality with the second access point is higher than a communication quality with the first access point.

2. The communication control apparatus according to claim 1, wherein
    the authentication unit is configured to acquire, using the at least one processor, the authentication information by maintaining the communication between the communication unit and the first access point and also executing the authentication processing for the second access point when the communication quality with the second access point exceeds the first threshold even when the communication quality with the second access point is lower than the communication quality between the communication unit and the first access point while the communication unit communicates with the first access point.

3. The communication control apparatus according to claim 1, wherein
    the communication control unit is configured to execute, using the at least one processor, a search for an access point multiple times while the communication unit communicates with the first access point, and
    the authentication unit is configured to acquire, using the at least one processor, the authentication information by maintaining the communication between the communication unit and the first access point and also executing the authentication processing for the second access point when the communication quality with the second access point exceeds the first threshold in the search consecutively executed.

4. The communication control apparatus according to claim 1, further comprising:
    an authentication information control unit configured to delete, using the at least one processor, the authentication information held by the holding unit when the communication quality with the second access point is lower than or equal to a second threshold that is lower than the first threshold.

5. The communication control apparatus according to claim 1, wherein
    the communication control unit is configured to start, using the at least one processor, the wireless communication with the second access point by using the authentication information held by the holding unit when the communication quality with the second access point is higher than the communication quality with the first access point under a condition that a movement speed of the movable object is lower than a predetermined value.

6. The communication control apparatus according to claim 1, wherein
the wireless communication is wireless LAN communication.

7. The communication control apparatus according to claim 6, further comprising:
a mobile communication unit configured to perform, using the at least one processor, mobile communication, wherein
the communication control unit is configured to start, using the at least one processor, the wireless communication with the second access point in a case where the mobile communication is performed even when the communication quality with the second access point is lower than the first threshold.

8. The communication control apparatus according to claim 1, wherein
the movable object is a vehicle.

9. The communication control apparatus according to claim 2, wherein
the communication control unit is configured to execute, using the at least one processor, a search for an access point multiple times while the communication unit communicates with the first access point, and
the authentication unit is configured to acquire, using the at least one processor, the authentication information by maintaining the communication between the communication unit and the first access point and also executing the authentication processing for the second access point when the communication quality with the second access point exceeds the first threshold in the search consecutively executed.

10. The communication control apparatus according to claim 2, further comprising:
an authentication information control unit configured to delete, using the at least one processor, the authentication information held by the holding unit when the communication quality with the second access point is lower than or equal to a second threshold that is lower than the first threshold.

11. The communication control apparatus according to claim 3, further comprising:
an authentication information control unit configured to delete, using the at least one processor, the authentication information held by the holding unit when the communication quality with the second access point is lower than or equal to a second threshold that is lower than the first threshold.

12. The communication control apparatus according to claim 2, wherein
the communication control unit is configured to start, using the at least one processor, the wireless communication with the second access point by using the authentication information held by the holding unit when the communication quality with the second access point is higher than the communication quality with the first access point under a condition that a movement speed of the movable object is lower than a predetermined value.

13. The communication control apparatus according to claim 3, wherein
the communication control unit is configured to start, using the at least one processor, the wireless communication with the second access point by using the authentication information held by the holding unit when the communication quality with the second access point is higher than the communication quality with the first access point under a condition that a movement speed of the movable object is lower than a predetermined value.

14. The communication control apparatus according to claim 4, wherein
the communication control unit is configured to start, using the at least one processor, the wireless communication with the second access point by using the authentication information held by the holding unit when the communication quality with the second access point is higher than the communication quality with the first access point under a condition that a movement speed of the movable object is lower than a predetermined value.

15. The communication control apparatus according to claim 2, wherein
the wireless communication is wireless LAN communication.

16. The communication control apparatus according to claim 3, wherein
the wireless communication is wireless LAN communication.

17. The communication control apparatus according to claim 15, further comprising:
a mobile communication unit configured to perform, using the at least one processor, mobile communication, wherein
the communication control unit is configured to start, using the at least one processor, the wireless communication with the second access point in a case where the mobile communication is performed even when the communication quality with the second access point is lower than the first threshold.

18. A movable object comprising the communication control apparatus according to claim 1.

19. A communication control method in a communication apparatus provided in a movable object and configured to perform wireless communication, the communication control method comprising:
acquiring, while the communication apparatus communicates with a first access point, information indicating a communication quality with a second access point for which an authentication different from that for the first access point is required;
acquiring authentication information by maintaining the communication between the communication apparatus and the first access point and also executing authentication processing for the second access point responsive to the communication quality with the second access point exceeding a first threshold while the communication apparatus communicates with the first access point;
holding the acquired authentication information; and
starting wireless communication with the second access point by using the held authentication information when the communication quality with the second access point is higher than a communication quality with the first access point.

20. A non-transitory computer readable storage medium having stored thereon a program for controlling a communication apparatus provided in a movable object and configured to perform wireless communication, the program causing a computer to execute:
acquiring, while the communication apparatus communicates with a first access point, information indicating a communication quality with a second access point for which an authentication different from that for the first access point is required;

acquiring authentication information by maintaining the communication between the communication apparatus and the first access point and also executing authentication processing for the second access point responsive to the communication quality with the second access point exceeding a first threshold while the communication apparatus communicates with the first access point;

holding the acquired authentication information; and starting wireless communication with the second access point by using the held authentication information when the communication quality with the second access point is higher than a communication quality with the first access point.

* * * * *